United States Patent
Lohaus

[11] Patent Number: 6,067,876
[45] Date of Patent: May 30, 2000

[54] TORSIONAL VIBRATION DAMPER WITH ROLLING BODIES AS COUPLING ELEMENTS

[75] Inventor: Norbert Lohaus, Schweinfurt, Germany

[73] Assignee: Mannesmann Sachs AG, Schweinfurt, Germany

[21] Appl. No.: 09/140,520

[22] Filed: Aug. 26, 1998

[30] Foreign Application Priority Data

Aug. 26, 1997 [DE] Germany .............. 197 37 069

[51] Int. Cl.[7] ...................................... F16F 15/10
[52] U.S. Cl. .......................................... 74/574
[58] Field of Search .................. 74/574, 573 R, 74/573 F; 464/1, 185

[56] References Cited

U.S. PATENT DOCUMENTS

| | | |
|---|---|---|
| 2,205,401 | 6/1940 | Fischer . |
| 3,187,604 | 6/1965 | Hazel ........................ 74/574 |
| 4,955,330 | 9/1990 | Fabi et al. .................. 74/574 X |
| 5,295,411 | 3/1994 | Speckhart . |
| 5,819,598 | 10/1998 | Cooke et al. ................ 74/574 |

FOREIGN PATENT DOCUMENTS

| | | |
|---|---|---|
| 41 28 868 | 3/1993 | Germany . |
| 197 26 532 | 3/1998 | Germany . |
| 197 02 666 | 5/1998 | Germany . |
| 2 190 977 | 12/1987 | United Kingdom . |
| 2 318 169 | 4/1998 | United Kingdom . |

*Primary Examiner*—Mary Ann Battista
*Attorney, Agent, or Firm*—Cohen, Pontani, Lieberman & Pavane

[57] ABSTRACT

A torsional vibration damper has a plurality of transmission elements which are rotatable relative to one another about a common axis of rotation. The relative movement of the transmission elements is carried out by the deflection of coupling bodies which are displaceable between the transmission elements along guide paths. A first guide path is provided on at least one of the transmission elements enabling a movement of the respective coupling body in the circumferential direction. The first guide path has a curvature which is formed with a curvature location having the maximum distance from the axis of rotation. A second guide path substantially free of curvature is provided on at least another transmission element allowing a movement of the coupling body in the radial direction. The coupling body is substantially free of curvature at least along a predeterminable portion of a contact zone facing the second guide path.

1 Claim, 6 Drawing Sheets

TORSIONAL VIBRATION DAMPER WITH ROLLING BODIES AS COUPLING ELEMENTS

BACKGROUND OF THE INVENTION

1. Field of the Invention

The present invention is directed to a torsional vibration damper having transmission elements rotatable relative to one another by deflection of coupling bodies which are displaceable along guide paths in both the circumferential and radial directions.

2. Description of the Related Art

German reference DE 41 28 868 is directed to a torsional vibration damper having a drive-side transmission element and a driven-side transmission element which is rotatable relative to the drive-side transmission element against the action of a damping device. The damping device serves to transmit torque between the two transmission elements. The damping device has springs which are guided, via sliding blocks, along a guide path extending in the circumferential direction and which serve as displaceable coupling bodies. A plurality of these springs form a spring set which is in a working connection with one of the transmission elements at one end and with the other transmission element at the other end. Therefore, a deflection of one of the transmission elements in the circumferential direction by a relative movement of the coupling body results in a deflection of the other transmission element.

Torsional vibration dampers according to the above-mentioned reference are suitable for filtering a wide frequency range, that is, for damping amplitudes of different orders. However, particularly troublesome amplitudes of a certain order cannot be effectively suppressed in the manner that is often required.

By constructing the coupling bodies as springs, it is ensured that the two transmission elements will be moved back into their initial positions after every relative deflection brought about by a torsional vibration. Thus, the two transmission elements have an exactly defined reference position relative to one another in the unloaded state. However, a disadvantage in such coupling bodies is that the inertia, which the corresponding transmission element produces in opposition to an introduced torsional vibration, is not changeable. Further, the constructional design of a torsional vibration damper of this type is relatively complicated, since control elements must be provided for the springs at both flywheel masses, the springs acting between these control elements.

A transmission element in the form of a flywheel mass is known from U.S. Pat. No. 5,295,411, in which a circular compensating flywheel mass is received in each of a plurality of circular cavities, wherein the diameter of the compensating flywheel mass is smaller than that of the cavity. A flywheel mass of this type is commonly referred to as a Salomon or Solomon damper and has the advantage that the compensating flywheel masses deflection velocities are dependent on changes in the rate of rotation at the flywheel mass. With a flywheel mass of this kind, torsional vibrations of a determined order, preferably of the second order in a four-cylinder internal combustion engines, can be reduced by a determined amount at defined amplitude values. Disadvantageously, however, it is not possible to influence vibrations of another order. Further, wear can result in the running area of the compensating flywheel mass in the cavity or recess because of the linear, and therefore small, contact zone with the respective compensating flywheel mass. Therefore, the recess and compensating flywheel mass become deformed. This in turn negatively influences the deflection behavior of the compensating flywheel mass and accordingly the damper behavior of the flywheel mass. U.S. Pat. No. 2,205,401 shows another damper in which a flywheel mass, having guide paths for damper masses which are in a working connection with an actuating or adjusting device, is fastened to a drive, for example, a crankshaft. The damper masses, as well as the guide paths associated therewith, have a curvature, preferably in a circular shape. The radius of curvature of the damper masses is smaller than that of the associated guide paths so as to enable a rolling movement of the damper masses in the guide paths when torsional vibrations are introduced via the flywheel mass. The plurality of guide paths and the adjusting device mentioned above enable the damper masses to be brought, during an adjusting process by the adjusting device, into the respective guide path required for damping a torsional vibration of a determined order occurring precisely at that time. In contrast to the damper of U.S. Pat. No. 5,295,411, not just one order, but a number of orders can be reduced by a determined amount. Nevertheless, it is not possible to influence torsional vibrations of other orders. Furthermore, the problem of wear at the guide paths, discussed above, also exists.

SUMMARY OF THE INVENTION

One object of the present invention is to provide a torsional vibration damper, and in particular to provide a torsional vibration damper for torsional vibrations generated by a drive, such as an internal combustion engine, so as to maximize the filtering out of the torsional vibrations. Another object of the present invention is to provide a torsional vibration damper having a minimum amount of wear. Still another object of the present invention is to provide such a damper of the most economical construction.

The torsional vibration damper of the present invention advantageously utilizes two guide paths for the deflection of coupling bodies for carrying out the relative movement of transmission elements about a common axis of rotation. A first guide path having a curvature, with a curvature location arranged thereon at a maximum distance from the axis of rotation, is provided at a drive-side transmission element. The first guide path therefore enables a movement of the coupling bodies having a substantial component in the circumferential direction. A second guide path, being substantially free of curvature, is provided at a driven-side transmission element. The second guide path thereby enables a movement of the coupling bodies having a substantial component in the radial direction. A contact zone, substantially free of curvature, is provided at the coupling body, at least along a predeterminable portion of the coupling body movement region facing the second guide path.

The construction of the torsional vibration damper with two guide paths for a coupling body has the following advantages. As soon as the torsional vibration damper is set in rotation about its axis of rotation, the coupling body is pushed radially outward, by centrifugal force, within a recess which receives the coupling body and acts as a second guide path, so that the coupling body comes to a stop in a position in which the curvature location of the first guide path is at a maximum distance from the axis of rotation. During this movement of the coupling body along the second guide path, the fact that the contact zone of the coupling body and second guide path are formed essentially without curvature is advantageous in that a large-surface sliding area is created between the coupling body and the second guide path. Therefore, loading of the contact zone is relatively slight, even when sudden torque surges are transmitted along this contact zone. On the one hand, this minimizes wear on the coupling body and the second guide path. On the other hand, transmitted torque is introduced along such an extensive surface area that, in an embodiment having a planar sliding block penetrating into the second guide path provided at the coupling body on at least one bearing journal, and having a slide bushing arranged radially between the sliding block and the bearing journal, there is no undesirable deformation. This holds true in a further embodiment wherein the slide bushing receives at least one of the structural component parts cooperating with it, namely the bearing, journal or the sliding block, with predetermined play which would otherwise promote deformation of the slide bushing. This provides lasting assurance that the sliding block rolls smoothly relative to the bearing journal of the coupling body.

Alternatively, the slide bushing may be omitted by forming the sliding block from a material providing good sliding properties.

There is normally play between the bearing journal of the coupling body and the first guide path, between the bearing journal and the sliding block, and between the sliding block and the second guide path. As long as there is no load applied, this play can manifest itself as an undesirable dead or empty path during torsional vibrations. In order to avoid this problem, in accordance with an embodiment of the present invention, the sliding block, and therefore the entire coupling body, is pressed into an exactly defined position by means of at least one energy accumulator and is held in this position as long as no other forces occur.

Regardless of the advantage resulting from the configuration of the coupling body and the second guide path according to the present invention, when torsional vibrations or torque are introduced from the drive-side transmission element to the driven-side transmission element, due to inertia the coupling body disengages from its position on the first guide path at the maximum distance from the axis of rotation. Specifically the coupling body is deflected in the direction opposite to the direction of acceleration of the transmission element. The extent of the deflection of the coupling body depends on the magnitude of the torsional vibration or torque. This deflection thus acts in the direction opposite to the radially outwardly directed centrifugal force, becoming more pronounced the higher the rate of rotation of the torsional vibration damper. To this extent, the behavior of the coupling body is dependent on the rate of rotation, in that the deflection of the coupling body becomes increasingly more difficult as the rate of rotation of the torsional vibration damper increases. Thus, the behavior of the coupling body corresponds to that of a spring whose stiffness increases as the rate of rotation increases.

Due to the fact that the coupling body is received in the second guide path as a result of its being movable in the radial direction, but held so as to be fixed in the circumferential direction, the driven-side transmission element is carried along when a torsional vibration is introduced to the drive-side transmission element. In this respect, the coupling body acts as a torque-transmitting connection between the two transmission elements and accordingly fulfills the task which is met in the prior art, e.g., by springs. However, the present invention also has the advantage, due to movement of the coupling body along the first guide path, of increasing the inertia of the drive-side transmission element when a torsional vibration is introduced. Therefore, the coupling body in the torsional vibration damper of the present invention acts not only as a coupling element, between the transmission elements, but also acts as a compensating flywheel mass of a damper element, as in the case of the Solomon damper, for example. This advantageously results in excellent characteristics insofar as the damping of torsional vibrations is concerned.

Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

DETAILED DESCRIPTION OF THE PREFERRED EMBODIMENTS

Figure 1:
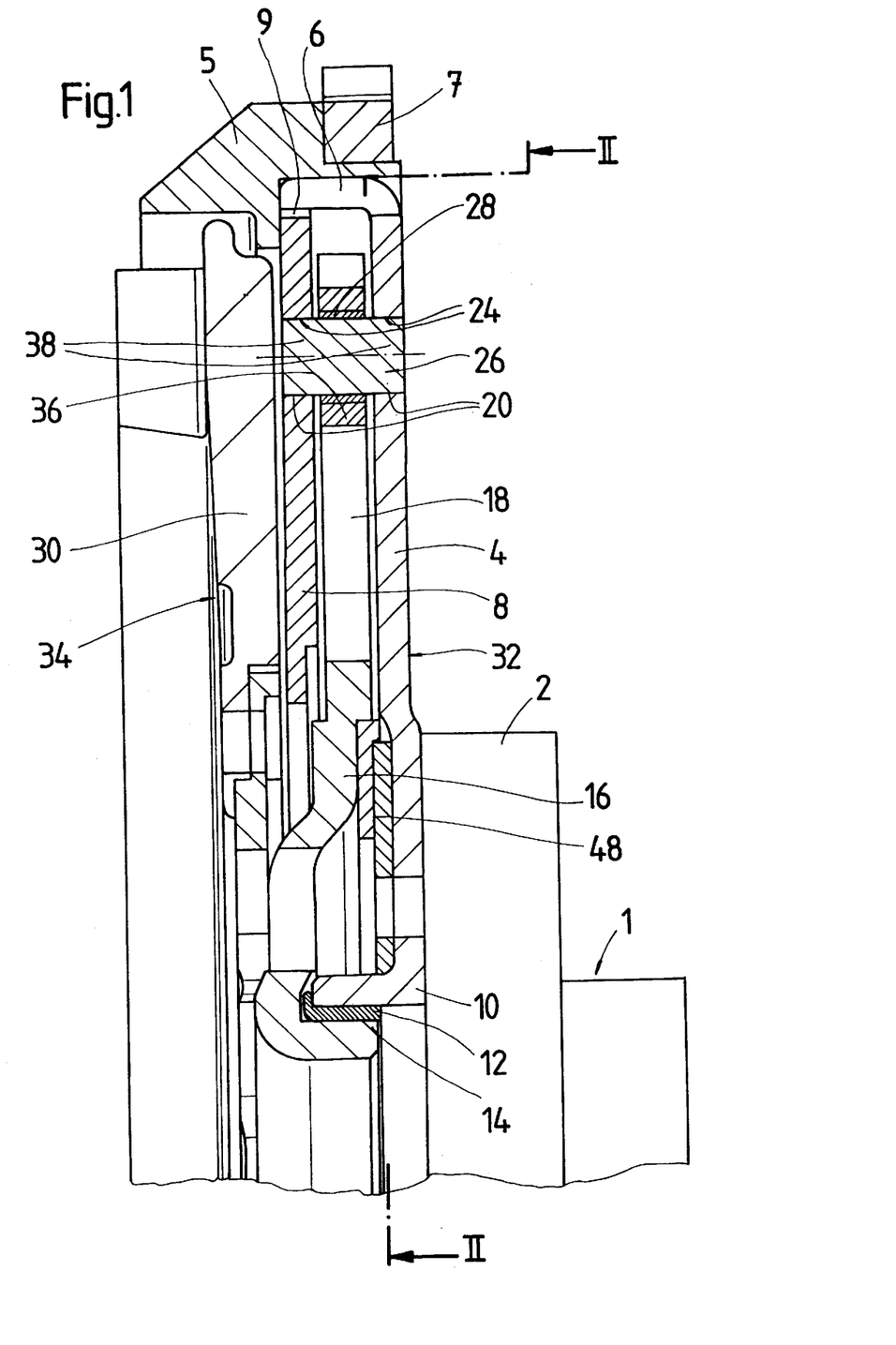
FIG. 1 shows a longitudinal section through a half-view of the torsional vibration damper of the present invention.
Figure 2:
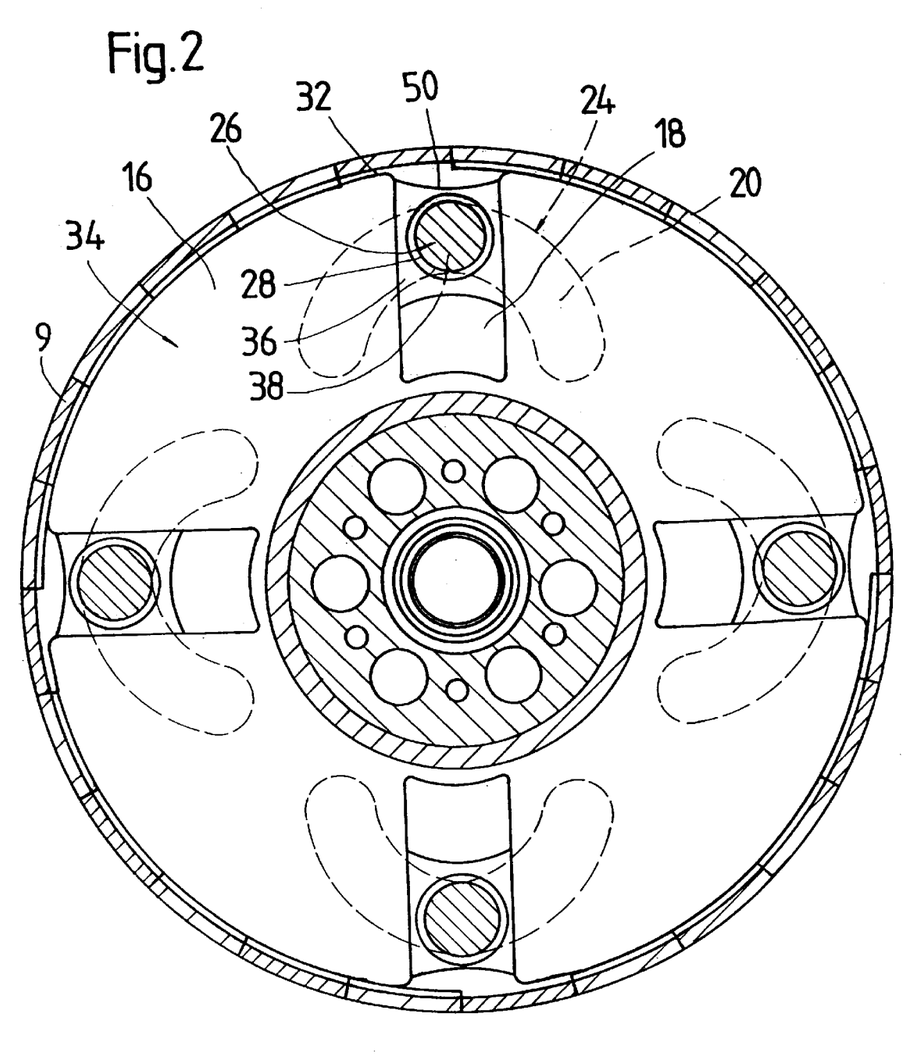
FIG. 2 shows a view according to section II—II in FIG. 1.
Figure 3:
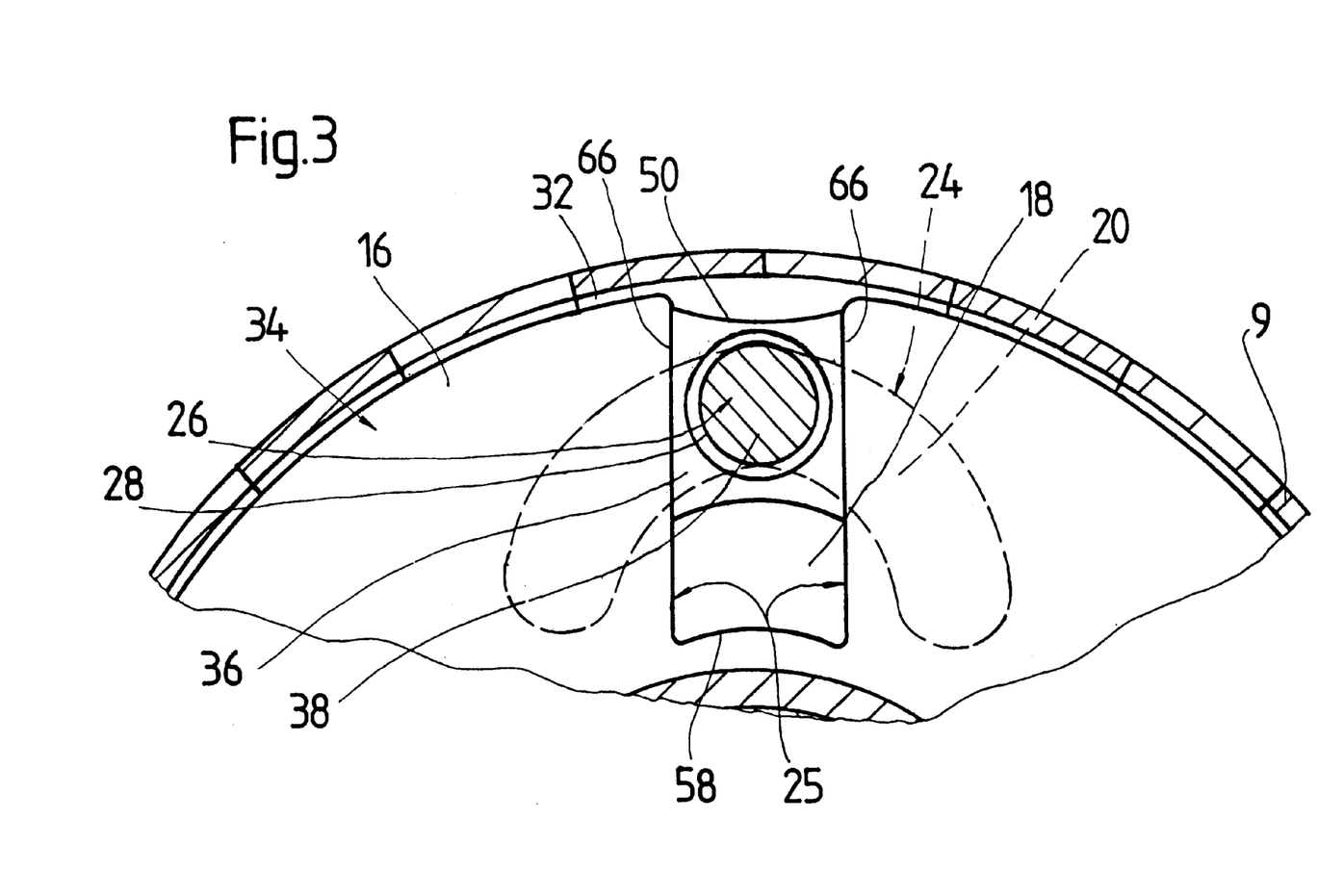
FIG. 3 shows an enlarged detail of a segment from FIG. 2.

FIGS. 1 to 3 are schematic views of a torsional vibration damper of the present invention configured as a two-mass flywheel. A drive-side transmission element 32 includes a primary flange 4, a cover plate 8 and a flywheel mass 5. The primary flange 4 extends outward radially and is fastened in a manner that is not shown to a drive 1 in the form of a crankshaft 2. The primary flange 4 has bent portions 6 in the radial outer region which are distributed along the circumference extending in a direction facing away from the crankshaft 2 so as to communicate, without play in the circumferential direction, with bent portions 9 of the cover plate 8 extending in the direction of the crankshaft 2. The primary flange 4 is in an axial connection with the cover pate 8 by means of the flywheel mass 5 which is pressed on in the circumferential area and carries a toothed rim 7. The rim 7 engages with the teeth of a starter pinion, not shown.

A hub disk 16 having a radial inner end is provided axially between the primary flange 4 and the cover plate 8. A secondary hub 14, located at the radial inner end of the hub disk 16, extends in the direction of the crankshaft 2. The secondary hub 14 is enclosed radially by a bearing 12, the bearing 12 being guided in turn at the radial inner side of a primary hub 10. The primary hub 10 is formed at the inner circumference of the primary flange 4 and extends in the direction of the hub disk 16. The hub disk 16 acts as a driven-side transmission element 34 by means of a connection, not shown, with a flywheel mass 30 and is centered relative to the drive-side transmission element 32 by the bearing 12.

The hub disk 16 can be seen more clearly in FIG. 2. Cutouts 18 extending in the radial direction are distributed uniformly over the circumference of the hub disk 16, a sliding block 36 being received in each cutouts 18 so as to be movable. Each cutout 18 is larger in the radial direction than the respective sliding block 36, so that the cutouts 18 receive the sliding blocks 36 in the circumferential direction either with virtually no play or with predetermined play, depending on the particular embodiment. A recess 20 configured in the primary flange 4 and a matching recess 20 configured in the cover plate 8 are associated with each of the cutouts 18. As can be seen in FIG. 2 and FIG. 3, the recesses 20 extend in the circumferential direction with curved shape so as to receive bearing journals 38 which jut out at both sides of the sliding block 36. Each of the recesses 20 acts as first guide path 24 for a coupling body 26. The coupling body 26 includes the sliding block 36, the bearing journal 38 as well as a slide sleeve 28 pressed on the bearing journal 38 so as to receive the sliding block 36 with play. As will be explained more fully hereinafter, during a deflection of the transmission elements 32, 34 relative to one another, the coupling body 26 can carry out a movement in the recesses 20 as well as in the cutout 18 simultaneously, the cutout 18 serving as a second guide path 25 for the sliding block 36 and accordingly for the coupling body 26.

When a torsional vibration is introduced at the crankshaft 2, the drive-side transmission element 32 executes a rotational irregularity resulting in a deflection of the coupling body 26 in the opposite rotating direction. The extent of the deflection of the coupling body 26 depends on the magnitude of the torsional vibration, on the ascending slope of the first guide path 24 and on the rate of rotation of the torsional vibration damper. Since centrifugal force increases as the rate of rotation increases, the contact pressure of the coupling body 26 pressing against the outer curvature location of the first guide path 24, having the greatest distance from the axis of rotation, is extremely high, as is, the corresponding inertia which the coupling body 26 sets in opposition to a deflection under the influence of the torsional vibration. Conversely, at a very low rate of rotation, the introduction of the torsional vibration leads very easily to a deflection of the coupling body 26 from the outer curvature location of the first guide path 24.

The deflection of the coupling body 26 from the outer curvature location of the first guide path 24 is likewise carried out when the torque present at the drive-side transmission element 32 is transmitted to the driven-side transmission element 34 via the coupling body 26, the extent of deflection of the coupling body 26 depending to a great extent on the magnitude of the torque. In this connection, an increase in torque causes, by way of the deflection of the coupling body 26 in the recesses 20, the coupling body 26 to be drawn radially inward into the cutout 18, that is, into the second guide path 25, against the action of centrifugal force until a force equilibrium is established. In an embodiment of the present invention, the curvature of the first guide path 24 is configured by means of the respective curvature in such a way that small deflections from the center curvature location are effected against relatively slight resistance, while increasing deflection resistance builds up as the extent of deflection increases. A limiting of the extent of deflection is brought about by the first guide paths 24 when the coupling body 26 comes into contact with one of the ends of the first guide paths 24 on the circumferential side.

When the sliding block 36 of the coupling body 26 is engaged in the cutout 18 of the driven-side transmission element 34 without play in the circumferential direction, a deflection of the coupling body 26 is transmitted directly to the driven-side transmission element 34, so that the driven-side transmission element 34 is moved in the direction opposite to the deflecting direction of the drive-side transmission element 32. Advantageously, the torsional vibration arriving at the driven-side transmission element 34 is considerably reduced by the torsional vibration damper compared to the torsional vibration present at the crankshaft 2.

As shown in greater detail in FIG. 3, the cutout 18, configured in the driven-side transmission element 34, forms the second guide paths 25 for contacting the sliding block 36 for every direction in which torque is to be introduced by way of the coupling body 26. The second guide paths 25 are formed substantially without curvature extending in the radial direction. Contact zones 66 are arranged at the associated sides of the sliding block 36 so as to slidingly communicate with the respective second guide paths 25. Therefore, torques present at the drive-side transmission element 32 are transmitted, via the bearing journal 38, to the sliding block 36. The absence of curvature in the contact zones 66, ensures a large surface area for conduction of the torques to the guide paths 25 and thereby to the driven-side transmission element 34. Loading of the sliding block 36 as force per unit of surface area, is accordingly relatively low, so that the sliding block 36 provides for a good distribution of forces even during high torque impulses. The slide sleeve 28 is easily deformable, retaining dimensional stability when torques are transmitted, so as to ensure good relative movability between the bearing journal 38 and the sliding block 36 even when high torque surges occur.

Figure 4:
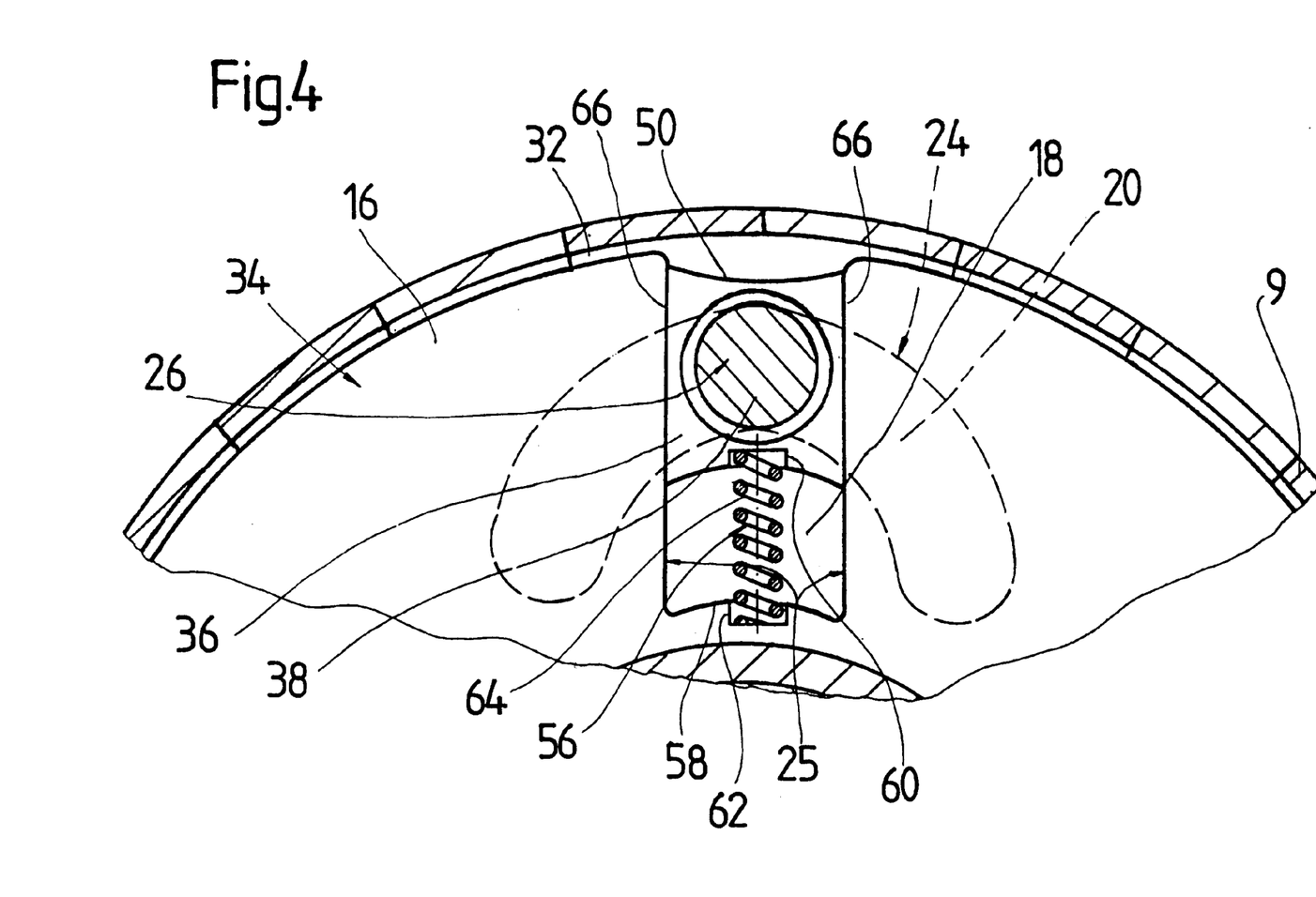
FIG. 4 corresponds to FIG. 3, showing another embodiment of the present invention having an energy accumulator.

FIG. 4 shows an embodiment of the present invention having an energy accumulator 56, such as a pressure spring 64, in connection with the coupling body 26, the energy accumulator 56 being essentially radially directed. In this embodiment, a cavity 60 is configured at the radial inner edge of the sliding block 36 and a corresponding cavity 62 is formed in the hub disk 16 adjoining a radial inner end 58 of cutout 18. One end of the spring 64 engages in the cavity 60 of the sliding block 36 and, the other end engages in the cavity 62 of the hub disk 16. The sliding block 36 is based outward radially by the energy accumulator 56, the bearing journal 38 being thereby pressed against the outer radial side of the first guide path 24 in the drive-side transmission element 32. A uniquely defined position is thereby assigned to the coupling body 26 in the region of the guide paths 24 and 25, so as to eliminate unwanted play which would result in an undesirable empty path at the coupling body 26 in the absence of load and torsional vibrations. The unwanted play is an aggregate of play components present between the first guide paths 24 and the bearing journals 38, between the slide sleeve 28 and sliding block 36, and between the sliding block 36 and the second guide paths 25.

Figure 5:
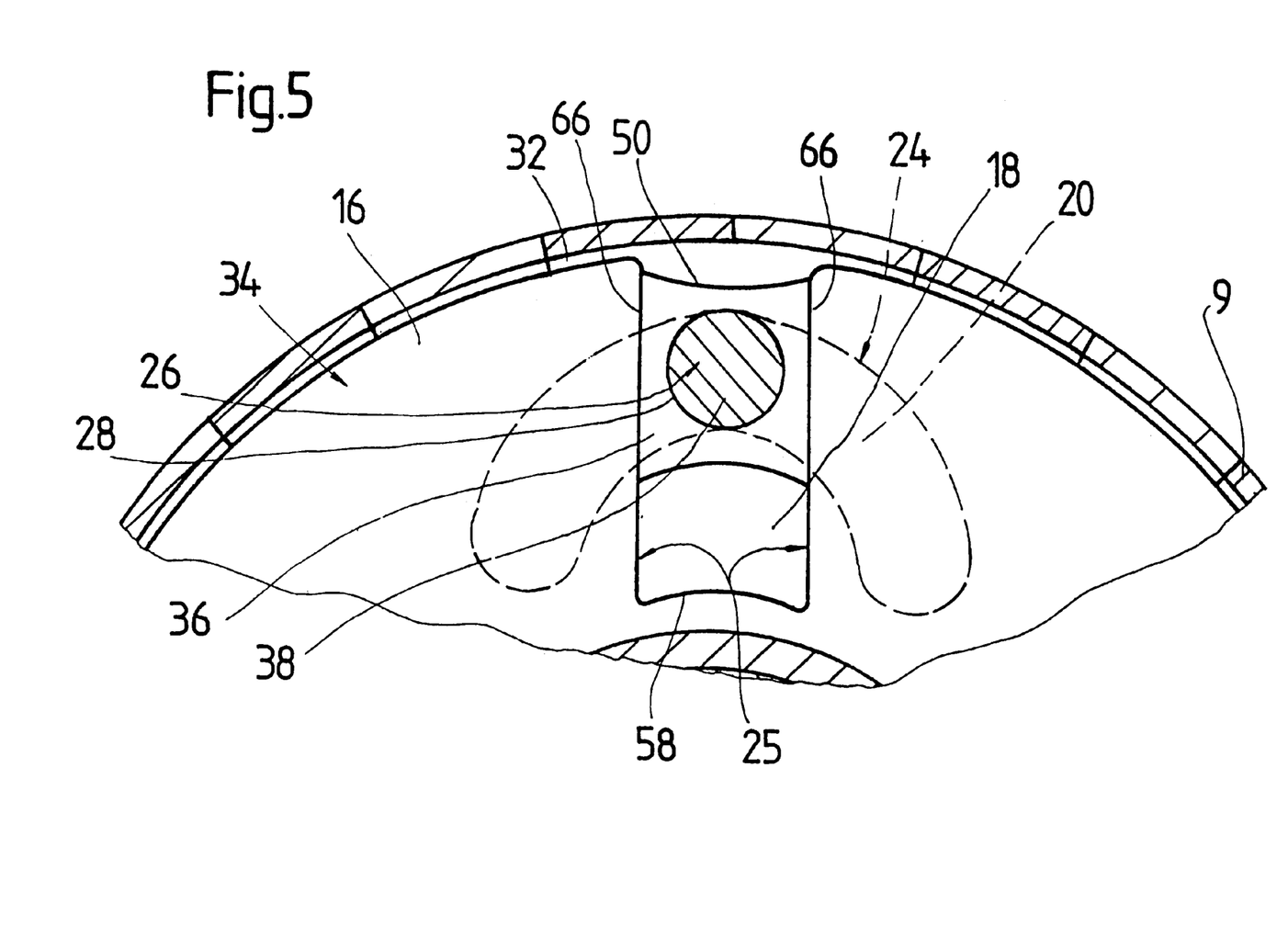
FIG. 5 corresponds to FIG. 3, showing a further embodiment of the present invention.

In another embodiment of the present invention, as shown in FIG. 5, the sliding block 36 is made of a material with good sliding properties and the slide sleeve 28 is omitted. This results in advantages not only at the contact zone 66 of the sliding block 36 and at the guide paths 25, but also between the sliding block 36 and the bearing journal 38. Preferably, the surface of the bearing journal 38 is constructed so as to be somewhat rougher than the inner side of the sliding block 36 enclosing the bearing journals 38, wherein bronze or ceramic material, for example, can be a suitable material having good sliding properties as well as the required strength for transmitting torque.

Figure 6:
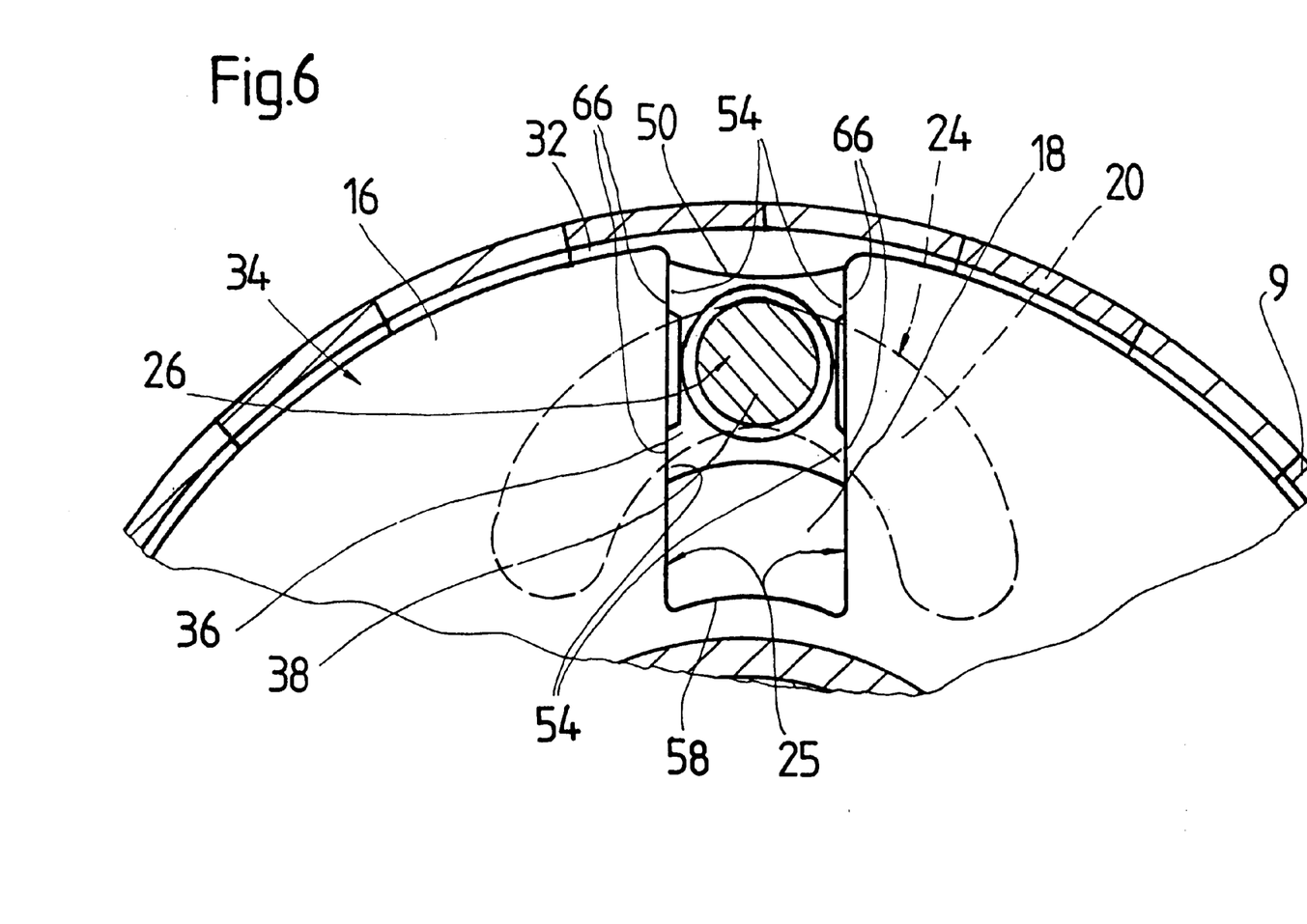
FIG. 6 corresponds to FIG. 3, showing yet another embodiment of the present invention.

According to FIG. 6, in a further embodiment of the present invention, the sliding block 36 is not free of curvature along its entire side moving relative to the adjacent second guide path 25, but rather only in portions 54 which, in this case, are preferably provided at the radial inner and radial outer ends of the sliding block 36. The advantages underlying the invention as discussed above can also be achieved when the contact zone 66 associated with the guide paths 25 is constructed in this way.

The preferred embodiments of the present invention are described above with reference to a two-mass flywheel. However, it is understood that the inventive coupling bodies can also be used in a conventional clutch disk to achieve the same advantages. Further, the coupling bodies according to the present invention can also be used in curved paths to achieve the above-described advantages, wherein, as is known in the art, a sliding block of the coupling body is received in the curved paths as a guiding means which is swivel ably supported at the other transmission element.

The invention is not limited by the embodiments described above which are presented as examples only but can be modified in various ways within the scope of protection defined by the appended patent claims.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

I claim:

1. A torsional vibration damper comprising:

a plurality of transmission elements rotatable relative to one another about a common axis of rotation, a first one of the transmission elements defining at least one first guide path, at least a second one of the transmission elements defining at least one second guide path substantially free of curvature; and a coupling body in a working connection with the transmission elements so as to be displaceable between the transmission elements along the at least one first guide path and along the at least one second guide path, whereby relative movement of the transmission elements is carried out by deflection of the coupling body, the at least one first guide path enabling a movement of the coupling body having a substantial component in the circumferential direction, and the at least one first guide path having a curvature with a curvature location at a maximum distance from the axis of rotation, the at least one second guide path enabling a movement of the coupling body having a substantial component in the radial direction, the coupling body having a contact zone that is substantially free of curvature, at least along a predeterminable portion of the coupling body facing the at least one second guide path, the coupling body including at least one sliding block slidably arranged within the at least one second guide path so as to facilitate movement of the coupling body in the radial direction, the at least one sliding block having at least one bearing journal arranged therethrough so as to facilitate movement of the coupling body in the circumferential direction, the contact zone being configured each side of the at least one sliding block so as to be in communication with the at least one second guide path; and energy accumulator means arranged radially within the at least one second guide path of the second transmission element for acting on the at least one sliding block so as to position the bearing journal at a predeterminable side of the at least one first guide path, the at least one second guide path having a radial end and the energy accumulator means having two ends, one end of the energy accumulator means being supported at the radial end of the at least one second guide path and the other end of the energy accumulator means being supported at the at least one sliding block, the second transmission element having a cutout that defines the second guide path, the cutout having a radial cavity, the at least one sliding block having a radial cavity, the energy accumulator means being arranged so that one end of the energy accumulator means engages in the radial cavity of the second guide path and the other end of the energy accumulator means engages in the radial cavity of the sliding block.

* * * * *